United States Patent
Stuart et al.

(10) Patent No.: US 9,772,004 B1
(45) Date of Patent: Sep. 26, 2017

(54) SHAFT ASSEMBLY WITH BALANCE WEIGHT BONDED TO SHAFT MEMBER

(71) Applicant: American Axle & Manufacturing, Inc., Detroit, MI (US)

(72) Inventors: Charles G. Stuart, Rochester Hills, MI (US); John C. Hibbler, Lake Orion, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 15/186,567

(22) Filed: Jun. 20, 2016

(51) Int. Cl.
*F16F 15/32* (2006.01)
*F16F 15/34* (2006.01)
*G01M 1/30* (2006.01)

(52) U.S. Cl.
CPC ............ *F16F 15/34* (2013.01); *F16F 15/322* (2013.01); *F16F 15/328* (2013.01); *G01M 1/30* (2013.01); *Y10T 29/49826* (2015.01); *Y10T 464/50* (2015.01)

(58) Field of Classification Search
CPC ......... G01M 1/30; G01M 1/32; Y10T 464/50; Y10T 29/49826; F16F 15/322; F16F 15/328; F16F 15/34
USPC ............................. 464/180; 29/DIG. 1, 428
See application file for complete search history.

(56) References Cited

U.S. PATENT DOCUMENTS

| | | | |
|---|---|---|---|
| 6,619,119 B1 | 9/2003 | Duggan et al. | |
| 6,701,802 B2 | 3/2004 | Bogen | |
| 6,811,633 B1 | 11/2004 | Myers | |
| 7,997,989 B2 * | 8/2011 | Friedman | ............... F16F 15/322 464/180 |
| 2004/0180726 A1 | 9/2004 | Freeman et al. | |

FOREIGN PATENT DOCUMENTS

WO   WO 2007081843 A1 *   7/2007   ............ F16F 15/328

OTHER PUBLICATIONS

Joining Plastics. London, UK: Rapra Technology Ltd, 2006. Paper 4, p. 9. ISBN: 9781859575703.*

* cited by examiner

*Primary Examiner* — Josh Skroupa
(74) *Attorney, Agent, or Firm* — Harness, Dickey & Pierce, P.L.C.

(57) ABSTRACT

A method for balancing a shaft assembly having a shaft member. The method can include providing a balance weight having a body portion that is formed of a material that permits transmission of ultra-violet (UV) light therethrough, the body portion having a perimeter; applying an UV light-curable adhesive to at least one of the balance weight and the shaft member; positioning the balance weight to the shaft member such that the UV light-curable adhesive is abutted to the balance weight and the shaft member; and transmitting UV light through the balance weight to cure at least a portion of the UV light-curable adhesive that is disposed inwardly of the perimeter of the body portion.

17 Claims, 2 Drawing Sheets

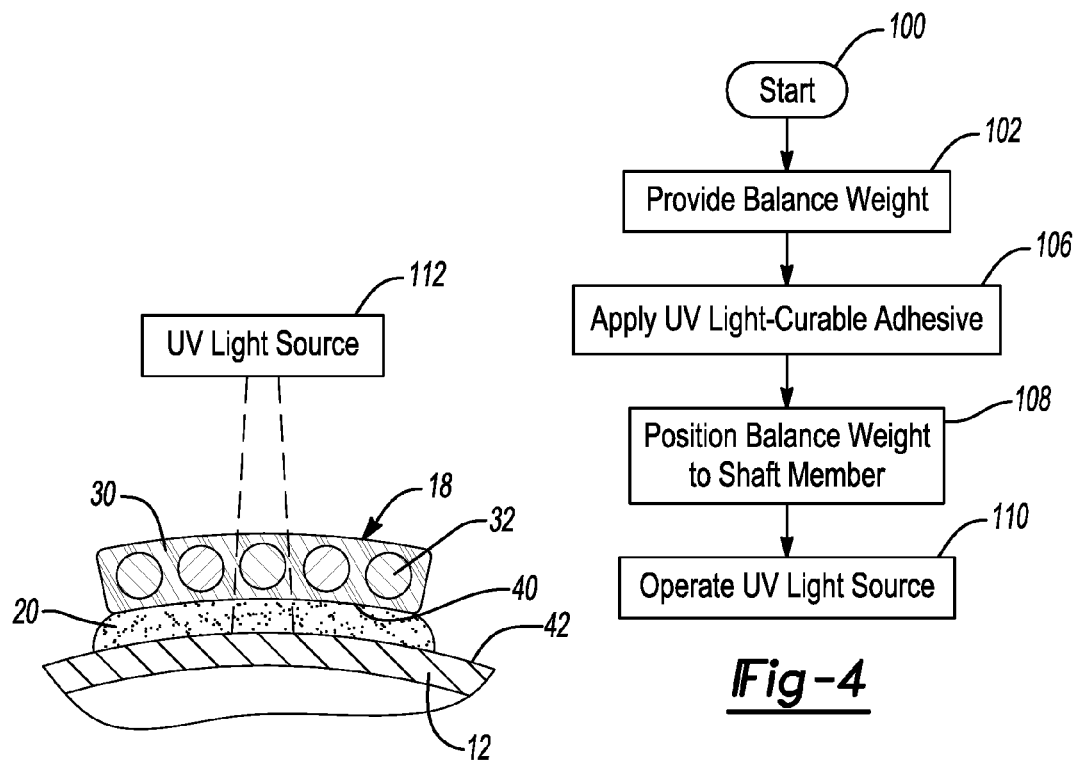
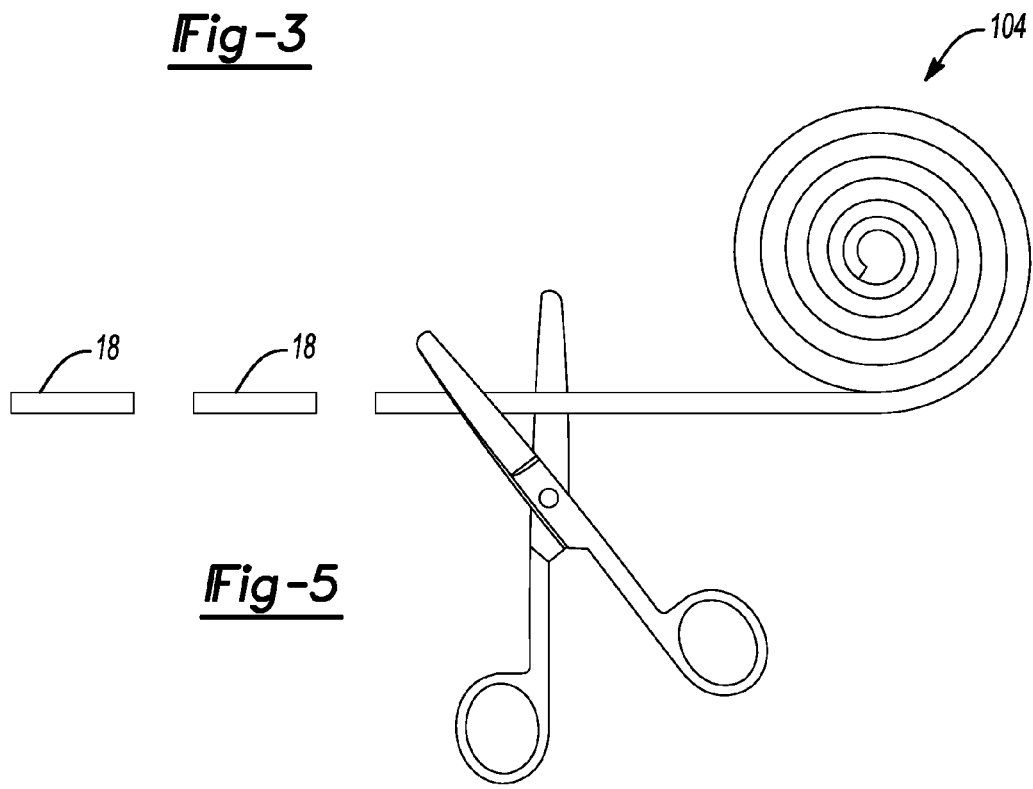

US 9,772,004 B1

SHAFT ASSEMBLY WITH BALANCE WEIGHT BONDED TO SHAFT MEMBER

FIELD

The present disclosure relates to a shaft assembly with a balance weight that is bonded to a shaft member.

BACKGROUND

This section provides background information related to the present disclosure which is not necessarily prior art.

Shaft assemblies, such as driveshafts or propshafts, may exhibit an out-of-balance condition when rotated. Typically, balance or counter weights are welded to a shaft member of a shaft assembly to correct the out-of-balance condition. In some situations, the welding of balance weights to a shaft member can reduce the fatigue life of the shaft member. This may be particularly undesirable when the shaft member is formed from aluminum, as relatively thicker aluminum tubing, which is heavier and more costly, may be needed to offset the reduction in fatigue life that would occur when the balance weights were welded to the shaft member.

It has been suggested that an ultra-violet (UV) light curable adhesive be used to secure a balance weight to a shaft member. However, the UV light that is employed to cure the adhesive is typically only able to cure the adhesive that borders the perimeter of the balance weight and consequently, this approach is not able to cure a sufficient amount of the adhesive to secure the balance weight to the shaft member that would achieve a bond strength that meets our needs. As such, there remains a need in the art for an improved method for balancing a shaft assembly and a related balanced shaft assembly.

SUMMARY

This section provides a general summary of the disclosure, and is not a comprehensive disclosure of its full scope or all of its features.

In one form, the present teachings provide a method for balancing a shaft assembly having a shaft member. The method can include providing a balance weight having a body portion that is formed of a material that permits transmission of ultra-violet (UV) light there through, the body portion having a perimeter; applying an UV light-curable adhesive to at least one of the balance weight and the shaft member; positioning the balance weight to the shaft member such that the UV light-curable adhesive is abutted to the balance weight and the shaft member; and transmitting UV light through the balance weight to cure at least a portion of the UV light-curable adhesive that is disposed inwardly of the perimeter of the body portion.

In another form, the present teachings provide a shaft assembly that includes a shaft member, a balance weight, which has a body portion with a perimeter, and a UV light-cured adhesive that bonds the balance weight the shaft member. The UV light-cured adhesive is disposed inwardly of the perimeter of the body portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a section view taken along the line 3-3 of FIG. 2;

FIG. 4 is a schematic illustration in flowchart form of an exemplary method for forming a shaft assembly in accordance with the teachings of the present disclosure; and FIG. 5 is a schematic illustration of an exemplary method for forming a balance weight constructed in accordance with the teachings of the present disclosure.

Corresponding reference numerals indicate corresponding parts throughout the several views of the drawings.

DETAILED DESCRIPTION

Figure 1:
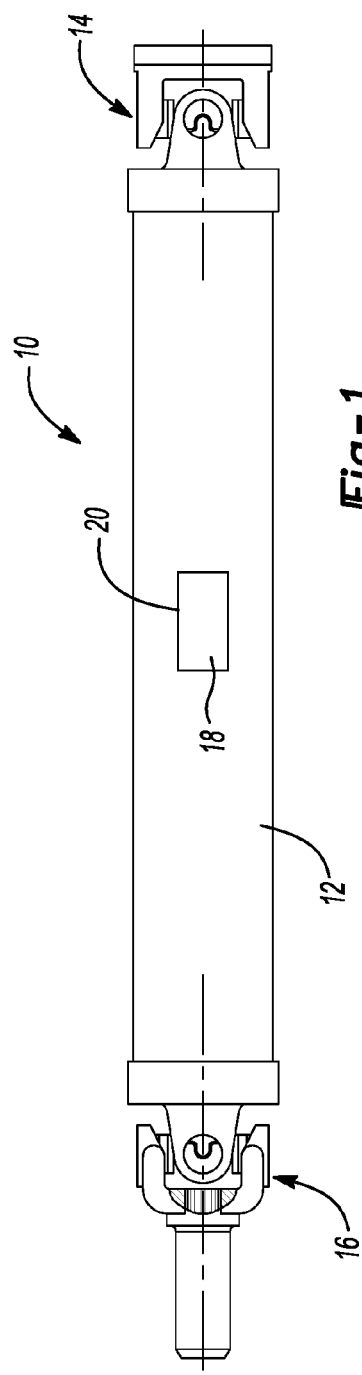
FIG. 1 is a side elevation view of an exemplary shaft assembly constructed in accordance with the teachings of the present disclosure.

With reference to FIG. 1 of the drawings, an exemplary shaft assembly constructed in accordance with the teachings of the present disclosure is generally indicated by reference numeral 10. The shaft assembly 10 can be any type of shaft assembly that is configured to transmit rotary power, but in the particular example provided, the shaft assembly 10 is a propshaft that is employed in a vehicle driveline to transmit propulsive rotary power.

The shaft assembly 10 can include a shaft member 12, first and second joints 14 and 16, respectively, one or more balance weights 18 (only one is shown in the example provided) and an ultra-violet (UV) light-cured adhesive 20. The shaft member 12 and first and second joints 14 and 16 can be constructed in a conventional manner and as such, a detailed discussion of these components is not needed herein. Briefly, the shaft member 12 can be a tubular structure that can be formed of an appropriate material, such as steel, aluminum, carbon fiber, etc. The first and second joints 14 and 16 can be configured to permit relative movement between the driveline components while transmitting rotary power. For example, the first and second joints 14 and 16 can be Cardan joints, or can be a type of universal joint, such as a constant velocity joint or a tripod joint.

Figure 2:
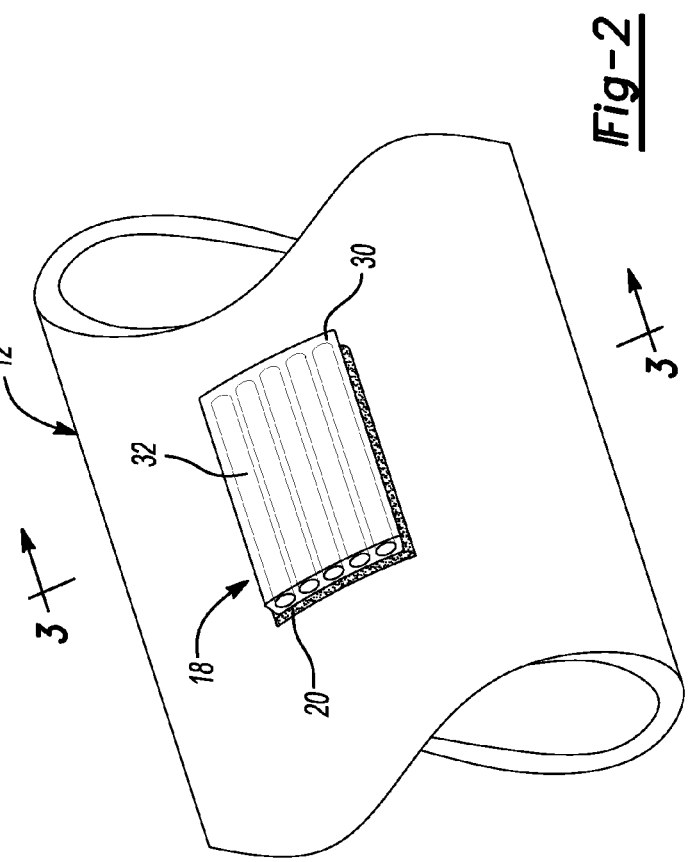
FIG. 2 is a perspective view of a portion of the shaft assembly of FIG. 1.

With reference to FIGS. 2 and 3, the balance weight 18 can have a body portion 30 and a weight portion 32. The body portion 30 can be formed of a material that permits transmission of UV light there through. In the particular example provided, the body portion 30 is formed of a transparent plastic material, but it will be appreciated that the body portion 30 need not be formed from a material that is transparent, but could also be formed from a material that is translucent. The weight portion 32, which is optional, can be formed of a material that has a density that is greater than a density of the material from which the body portion 30 is formed. For example, the weight portion 32 could be formed of a relatively soft metal, such as zinc. If desired, the weight portion 32 could be formed as two or more discrete structures that are disposed in the material from which the body portion 30 is formed. In the example provided, the weight portion 32 comprises a plurality of cylindrically shaped rods that are spaced apart from one another and embedded into the material that forms the body portion 30, but it will be appreciated that the weight portion 32 could be configured differently. For example, the weight portion 32 could be formed as one or more rods having a rectangular or square cross-section, or as relatively small particles that are interspersed within the material that forms the body portion 30.

The UV light-cured adhesive 20 is bonded to a radially interior surface 40 of the balance weight 18 and an exterior surface 42 of the shaft member 12. The UV cured adhesive 20 is disposed within the exterior perimeter of the balance weight 18 at one or more locations that would be inaccessible were the body portion 30 to be formed of a material that did not permit the transmission of UV light there through.

With reference to FIG. 4, a method for balancing a shaft assembly in accordance with the teachings of the present disclosure is illustrated. The method begins at bubble 100 and proceeds to block 102 where the balance weight 18 (FIG. 1) is provided. Optionally, the balance weight 18 could be cut from a strip of balance weight material 104 as shown in FIG. 5. The balance weight 18 could be cut from the strip so that it has a predetermined target mass, such as 25 grams. Alternatively, the method could include determining a magnitude of a correction mass that corrects an imbalance in the (unbalanced) shaft assembly and thereafter determining a length of the strip of balance weight material 104 that is needed so that the balance weight 18 and a UV light-curable adhesive have a mass that is equal to the magnitude of the correction mass.

Returning to FIGS. 1 and 4, the method can proceed to box 106, where a UV light-curable adhesive is applied to at least one of the balance weight 18 and the shaft member 12. The method can proceed to box 108.

In box 108, the balance weight 18 can be positioned relative to the shaft member 12 such that the UV light-curable adhesive is abutted to the balance weight 18 and the shaft member 12. The balance weight 18 can be positioned relative to the shaft member 12 such that when bonded to the shaft member 12, the balance weight 18 attenuates the rotational imbalance of the unbalanced shaft assembly. The positioning and sizing of balance weights to attenuate a rotational imbalance is well known in the art and as such, these details are not provided herein as they are within the level of ordinary skill in the art. The method can proceed to box 110.

In box 110, a source of UV light 112 (FIG. 3) can be operated to generate UV light that is transmitted through the balance weight 18 to cure at least a portion of the UV light-curable adhesive at a location that is disposed inwardly of the perimeter of the body portion 30 of the balance weight 18. The UV light that is transmitted through the body portion 30 of the balance weight 18 can interact with the UV light-curable adhesive to create a photochemical reaction that polymerizes the UV-light-curable adhesive to thereby form the UV light-cured adhesive. As used herein (and in the appended claims), the term "UV light-curable adhesive" refers to an uncured adhesive that is capable of being cured using UV light, whereas the term "UV light-cured adhesive" refers to an adhesive that has been cured (i.e., polymerized) using UV light. Significantly, the UV light-cured adhesive 20 is located inwardly from the perimeter of the balance weight 18 in one or more areas that would not otherwise be accessible if the body portion 30 of the balance weight were to be made of an opaque material that is not capable of having UV light transmitted there through.

It will be appreciated that the present invention permits the curing of the adhesive between a balance weight and the surface of the shaft member to be cured with UV light over a relatively large portion of the surface area of the balance weight 18, rather than just around the perimeter of the balance weight 18. Configuration in this manner provides vastly increased bond strength in a very short amount of time. This can be advantageous in high volume production because the high speed, high strength bonding permits the shaft assembly to be checked for rotational balance immediately after the balance weight 18 has been installed. This is important because the balance testing machines on which shaft assemblies (e.g., automotive propshafts) are balanced are extremely expensive and the reduced cycle time that is afforded by the curing of the UV light-curable adhesive over a relatively large area of the balance weight means that the balance testing machine on which the shaft assembly is mounted need not sit idle while waiting for an adhesive to harden.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for balancing a shaft assembly having a shaft member, the method comprising:
   providing a balance weight having a body portion that is formed of a material that permits transmission of ultra-violet (UV) light there through, the body portion having a perimeter;
   applying an UV light-curable adhesive to at least one of the balance weight and the shaft member;
   positioning the balance weight to the shaft member such that the UV light-curable adhesive is abutted to the balance weight and the shaft member; and
   transmitting UV light through the balance weight to cure at least a portion of the UV light-curable adhesive that is disposed inwardly of the perimeter of the body portion.

2. The method of claim 1, wherein the balance weight further comprises a weight portion that is formed of a material having a density that is greater than a density of the material from which the body portion is formed.

3. The method of claim 2, wherein the weight portion comprises two or more discrete structures that are disposed in the material from which the body portion is formed.

4. The method of claim 3, wherein the two or more discrete structures are formed as rods.

5. The method of claim 4, wherein the rods are cylindrically shaped.

6. The method of claim 1, further comprising:
   providing a strip of balance weight material; and
   cutting the balance weight from the strip of balance weight material.

7. The method of claim 6, further comprising:
   determining a magnitude of a correction mass that corrects an imbalance in the shaft assembly; and
   determining a length of the strip of balance weight material that is needed so that the balance weight and the UV light-curable adhesive have a mass that is equal to the magnitude of the correction mass.

8. The method of claim 1, wherein the material from which the body portion is formed is transparent.

9. The method of claim 8, wherein the material from which the body portion is formed is clear.

10. A shaft assembly comprising:
   a shaft member;
   a balance weight having a body portion with a perimeter, the body portion being formed of a material that permits transmission of ultra-violet (UV) light there through; and
   a UV light-cured adhesive that bonds the balance weight the shaft member, the UV light-cured adhesive being disposed inwardly of the perimeter of the body portion.

11. The shaft assembly of claim 10, wherein the balance weight further comprises a weight portion that is formed of a material having a density that is greater than a density of the material from which the body portion is formed.

12. The shaft assembly of claim 11, wherein the weight portion comprises two or more discrete structures that are disposed in the material from which the body portion is formed.

13. The shaft assembly of claim 12, wherein the two or more discrete structures are formed as rods.

14. The shaft assembly of claim 13, wherein the rods are cylindrically shaped.

15. The shaft assembly of claim 10, wherein the shaft assembly comprises a first joint that is fixedly coupled to an end of the shaft member.

16. The shaft assembly of claim 10, wherein the material from which the body portion is formed is transparent.

17. The shaft assembly of claim 16, wherein the material from which the body portion is formed is clear.

* * * * *